United States Patent
Zeller et al.

(10) Patent No.: US 8,691,313 B2
(45) Date of Patent: *Apr. 8, 2014

(54) NON-PROTEIN FOAMING COMPOSTITIONS AND METHODS OF MAKING THE SAME

(75) Inventors: Bary Lyn Zeller, Glenview, IL (US); Paul Bastiaan Van Seeventer, Meppel (NL); Albert Thijs Poortinga, Deventer (NL)

(73) Assignees: Intercontinental Great Brands LLC, Northfield, IL (US); Friesland Brands B.V., Pe Meppel (NL)

( * ) Notice: Subject to any disclaimer, the term of this patent is extended or adjusted under 35 U.S.C. 154(b) by 476 days.

This patent is subject to a terminal disclaimer.

(21) Appl. No.: 12/428,032

(22) Filed: Apr. 22, 2009

(65) Prior Publication Data

US 2009/0208629 A1    Aug. 20, 2009

Related U.S. Application Data

(63) Continuation of application No. 10/919,524, filed on Aug. 17, 2004, now Pat. No. 7,534,461.

(51) Int. Cl.
*A23L 2/40* (2006.01)

(52) U.S. Cl.
USPC .......... 426/564; 426/561; 426/569; 426/570; 426/590

(58) Field of Classification Search
USPC .......... 426/561, 564, 567, 569, 570, 590, 599
See application file for complete search history.

(56) References Cited

U.S. PATENT DOCUMENTS

| 2,659,675 | A | * | 11/1953 | Steiner | 426/590 |
| 2,791,523 | A | * | 5/1957 | Schoen | 127/37 |
| 3,291,614 | A | * | 12/1966 | Tumerman et al. | 426/99 |
| 4,438,147 | A | * | 3/1984 | Hedrick, Jr. | 426/570 |
| 5,156,765 | A | * | 10/1992 | Smrt et al. | 516/14 |
| 5,959,128 | A | * | 9/1999 | Kolstad et al. | 554/206 |
| 6,168,819 | B1 | | 1/2001 | Zeller et al. | |
| 6,713,113 | B2 | * | 3/2004 | Bisperink et al. | 426/564 |
| 2003/0026836 | A1 | | 2/2003 | Darbyshire et al. | |

FOREIGN PATENT DOCUMENTS

| EP | 1 228 694 | | 8/2002 | | |
| SU | 1697712 A1 | * | 12/1991 | | A23L 1/212 |

OTHER PUBLICATIONS

Igoe et al., Dictionary of Food Ingredients, Third Edition, Chapman & Hall, 1996, pp. 94, 108, 114 and 131.

* cited by examiner

*Primary Examiner* — Kelly Bekker
(74) *Attorney, Agent, or Firm* — Stephen J. Weyer, Esq.; Marvin Petry, Esq.; Stites & Harbison, PLLC

(57) ABSTRACT

A soluble foaming composition is provided which contains carbohydrate particles having a plurality of voids containing entrapped pressurized gas and less than two percent protein. The composition may include a surfactant and may be contained in a food product such as a beverage mix or an instant food. In addition, a method is provided for manufacturing the foaming composition in which the particles are heated and an external pressure exceeding atmospheric pressure is applied to the soluble foaming particles. The soluble foaming particles are cooled and the external gas pressure is released resulting in pressurized gas remaining in internal voids of the particles of the foaming composition.

31 Claims, No Drawings

NON-PROTEIN FOAMING COMPOSITIONS AND METHODS OF MAKING THE SAME

CROSS REFERENCE TO RELATED APPLICATIONS

This is a continuation of U.S. patent application Ser. No. 10/919,524, filed Aug. 17, 2004, now issued as U.S. Pat. No. 7,534,461.

FIELD OF THE INVENTION

The present invention relates to a soluble foaming composition, and in particular, a foaming protein-free composition.

BACKGROUND OF THE INVENTION

Some conventionally prepared food items include froth or foam. For example, cappuccino, milk shakes, and some soups may have froth or foam. While conventionally prepared food items may be considered preferable by some consumers, other consumers are increasingly demanding the convenience of consumer prepared instant food alternatives. In order to accommodate consumer preferences, manufacturers have developed instant food products which give consumers the food products they demand from a convenient instant food product by developing instant food items which have the same or similar characteristics as conventionally prepared food items. One challenge for manufacturers is how to produce a food product having froth or foam from an instant food item.

One prior solution used to manufacture an instant food product which has froth or foam is through the use of powdered foaming compositions which produce foam upon reconstitution in a liquid. Foaming powder compositions have been used to impart froth or foamed texture to a wide variety of foods and beverages. For example, foaming compositions have been used to impart froth or foamed texture to instant cappuccino and other coffee mixes, instant refreshing beverage mixes, instant soup mixes, instant milkshake mixes, instant dessert toppings, instant sauces, hot or cold cereals, and the like, when combined with water, milk, or other suitable liquid.

Some examples of gas-injected foaming creamers which can be used to impart foam or froth are disclosed in U.S. Pat. No. 4,438,147 and in EP 0 458 310. More recently, U.S. Pat. No. 6,129,943 discloses a foaming creamer produced by combining a gasified carbohydrate with protein and lipid. Using this technology, it was possible to eliminate gas injection of the liquid creamer composition prior to spray drying.

EP 0 813 815 B1 discloses a foaming creamer composition which is either a gas-injected foaming creamer or a creamer containing chemical carbonation ingredients which contains in excess of 20% protein by weight. The powder described has as essential ingredients, protein, lipid and filler material, the filler especially being a water-soluble carbohydrate. The high content of protein is needed to obtain a whipped cream-like, tight foam having spoonability.

One prior foaming composition is provided by U.S. Pat. No. 6,713,113 which discloses a powdered soluble foaming ingredient comprised of a matrix containing carbohydrate, protein, and entrapped pressurized gas. However, powdered ingredients containing both carbohydrate and protein are susceptible to nonoxidative browning reactions that can adversely affect the appearance, flavor, and shelf life of packaged food products. These complex chemical reactions occur between proteins and carbohydrates, especially reducing sugars, to form polymeric pigments that can severely discolor and diminish the flavor quality of food products. It has been discovered that highly effective foaming compositions containing entrapped pressurized gas can be manufactured without the need to use both carbohydrate and protein ingredients. Browning can occur very rapidly at high temperatures commonly used in food processing and susceptibility to browning can limit the range of heating conditions used to produce foaming compositions of the type disclosed in the aforementioned prior art.

A possible solution could be the use of a substantially protein-only composition, as described in WO-A-2004/019699. However, the use of protein itself also poses some problems. More importantly, none of the disclosed examples in the published patent application are devoid of carbohydrate.

U.S. Pat. No. 6,168,819 describes a particulate creamer comprising protein, lipid, and carrier, in which more than 50% by weight of the protein is partially denatured whey protein, the partially denatured whey protein being from 40 to 90% denatured. The total protein content of the creamer is between 3 and 30% by weight, preferably between 10 and 15% by weight. The creamer is particularly suitable for foaming creamer compositions. The foaming creamer composition, when added to a brewed hot coffee beverage, produces a large amount of creamy semi-solid foam.

U.S. Pat. No. 6,174,557 describes an instant particulate dry mix composition that produces a cappuccino beverage having surface foam with a marbled appearance upon reconstitution in water. The dry mix composition is made by deaerating and subsequently freeze drying a coffee extract to produce granules having an outer surface layer which is rapidly soluble and a larger inner core layer which is slowly soluble. The product has a density of at least 0.3 g/cc.

U.S. Patent Publication No. 2003/0026836 discloses a method for forming tablets or powders of carbohydrate-based pharmaceuticals or foods which includes subjecting tablets or powders which comprise a beverage base such as soluble coffee, foamed powder, sugar and creamer to pressure and temperature to produce a tablet or powder with increased solubility or dispersability on contact with water. In addition, a method is disclosed which promotes the dissolution or dispersion of a tablet or non-foaming powder by subjecting the tablet or powder to pressurized gas so that gas is entrapped therein to promote dissolution or dispersion of the tablet or powder on contact with water. It is notable that all examples provided therein of chemically compounded soluble compositions are carbohydrate-based powder or tablet compositions containing protein. Improved dissolution of tablets containing entrapped gas is demonstrated in working examples therein. However, improved dissolution or dispersability of powders, foaming or non-foaming, containing entrapped gas is not demonstrated in any working example therein.

A disadvantage of these recent combinations, as well as of many prior products, is that both proteins and carbohydrates are present. More importantly, even art directed to forming substantially protein-only compositions, such as WO-A-2004/019699, fail to disclose a working example devoid of carbohydrate. The foaming composition of WO-A-2004/019699 that forms the basis of all working examples disclosed therein contains carbohydrate glycerol at a level of 5% by weight. In fact, none of the relevant prior art discloses a working example or any reduction to practice of a foaming carbohydrate composition devoid of protein. Proteins can react with carbohydrates, especially when heated. Most of the time these (Maillard) reactions lead to undesired coloring and/or formation of off-flavor. This type of reaction generally occurs during processing or manufacturing, when the product is kept at higher temperatures for some time and often if it is kept at higher temperatures for prolonged times. In most of the preparation processes for the products described in the documents discussed herein-above, and particularly in the preparation processes described in U.S. Pat. No. 6,168,819, a prolonged time at elevated temperatures is used to gasify the powders. Also, proteins typically are much more costly and typically have much lower solubility and much higher viscosity in water than carbohydrates used to manufacture powdered foaming compositions. Accordingly, use of proteins can cause processing problems and increase the cost of foaming compositions. For example, protein solutions, even carbohydrate solutions containing protein, might have to be prepared at much lower concentration in water to avoid excessive viscosity and permit spray drying. In addition, many proteins are also susceptible to loss of functionality or solubility when exposed to heat during processing or when contacted with acidic food ingredients such as coffee powders. Finally, the presence of proteins in powdered foaming compositions can reduce the solubility or dispersability of these foaming compositions, as well as the solubility or dispersability of other ingredients in mixtures containing these foaming compositions, when reconstituted in water or other liquid.

Although foaming coffee additives are available, there is still a need for a powdered protein-free soluble foaming composition which, upon reconstitution, exhibits a foam characteristic desired by true cappuccino beverage connoisseurs. For example, prior resulting cappuccino beverages lack sufficient foam, the foam dissipates too quickly or there is a combination of both. Further, since prior foaming coffee additives included both a carbohydrate and a protein component, people on restrictive diets wishing to avoid one of the two components would not be able to consume any of the prior foaming coffee additives. Accordingly, a foaming coffee additive comprising a powdered protein-free soluble foaming composition is desirable which provides foam characteristics of a conventionally made cappuccino beverage.

SUMMARY OF THE INVENTION

The present invention relates to a non-protein, i.e., protein-free foaming composition which provides excellent resistance to browning and can provide additional advantages. For example, protein-free foaming compositions can have reduced allergenicity and microbiological sensitivity. These improved foaming compositions can be used in a wide variety of hot and cold soluble beverage mixes and other instant food products to provide froth or foamed texture.

The present invention, in one form thereof, concerns a foaming composition which comprises a powdered protein-free soluble composition which comprises carbohydrate particles having a plurality of voids containing entrapped pressurized gas. In various further embodiments, the soluble composition releases at least about 2 cc, and preferably at least about 5 cc, gas per gram of the composition when dissolved in liquid at ambient conditions. Further, the composition may include a surfactant.

The present invention in another form thereof concerns a foaming composition which comprises protein-free soluble foaming particles comprising a carbohydrate and having a plurality of internal voids containing entrapped pressurized gas. The foaming composition is formed by subjecting the particles to an external gas pressure exceeding atmospheric pressure prior to or while heating the particles to a temperature of at least the glass transition temperature ($T_g$) and then cooling the particles to a temperature below the $T_g$ prior to or while releasing the external gas pressure in a manner effective to trap the pressurized gas within the internal voids.

The present invention in another form thereof concerns a soluble consumable food product comprising a protein-free soluble foaming composition which comprises carbohydrate particles having a plurality of internal voids containing entrapped pressurized gas. In various further forms, the soluble food product may include a beverage mix such as coffee, cocoa, or tea, such as instant coffee, cocoa or tea, or the soluble consumable product may include an instant food product such as an instant dessert product, instant cheese product, instant cereal product, instant soup product, and an instant topping product.

The present invention in yet another form thereof concerns a method for manufacturing a foaming composition in which the method includes heating protein-free soluble foaming particles which includes a carbohydrate which has internal voids. An external pressure exceeding atmospheric pressure is applied to the protein-free soluble foaming particles. The protein-free soluble foaming particles are cooled and the external gas pressure is released thereby resulting in pressurized gas remaining in the internal voids. In further alternate forms, the external pressure is applied prior to heating the particles or the external pressure is applied while heating the particles.

Advantages of the foaming composition according to the invention are that, upon contact with a suitable liquid, an amount of foam is formed which provides desirable color, mouthfeel, density, texture, and stability when used to formulate instant cappuccino mixes or other products. Since it contains no protein, adverse side effects associated with proteins, such as off-flavor, Maillard reaction, and/or reactions between proteins and other substituents, do not occur or at least are reduced.

A further feature of the present, non-protein foaming composition is provided by the surprising stability of the foam, especially since, in the prior art, foam stability of the foaming powders was generally associated with the presence of protein.

Another advantage is that the present invention provides a foaming composition that has a high density and high gas content. The bulk density is generally higher than about 0.25 g/cc, preferably at least about 0.30 g/cc, and more preferably at least about 0.35 g/cc. Preferably, the bulk density is less than 0.8 g/cc, more preferably less than 0.7 g/cc, and most preferably less than 0.65 g/cc. Such powders may contain 5-20 cc or more gas per gram of powder. The high density has the advantage that only a small volume of foaming composition is required to obtain a desired amount of foam. The relatively high gas content produces a relatively large amount of foam per unit weight or volume of foaming composition added.

DETAILED DESCRIPTION OF THE PREFERRED EMBODIMENTS

Ingredients that can be used to formulate protein-free foaming compositions include carbohydrates, lipids, and other protein-free substances. Carbohydrates are preferred and include, but are not limited to sugars, polyhydric alcohols, sugar alcohols, oligosaccharides, polysaccharides, starch hydrolysis products, gums, soluble fibers, modified starches, and modified celluloses. Suitable sugars include glucose, fructose, sucrose, lactose, mannose, and maltose. Suitable polyhydric alcohols include glycerol, propylene glycol, polyglycerols, and polyethylene glycols. Suitable sugar alcohols include sorbitol, mannitol, maltitol, lactitol, erythritol, and xylitol. Suitable starch hydrolysis products include maltodextrins, glucose syrups, corn syrups, high-maltose syrups, and high-fructose syrups. Suitable gums include xanthan, alginates, carrageenans, guar, gellan, locust bean, and hydrolyzed gums. Suitable soluble fibers include inulin, hydrolyzed guar gum, and polydextrose. Suitable modified starches include physically or chemically modified starches that are soluble or dispersible in water. Suitable modified celluloses include methylcellulose, carboxymethyl cellulose, and hydroxypropylmethyl cellulose. The carbohydrate or the mixture of carbohydrates is selected such that the foaming composition structure is sufficiently strong to retain the gas enclosed under pressure. The lipid is preferably selected from fats and/or oils which include hydrogenated oils, interesterified oils, phospholipids, fatty acids derived from vegetable, dairy or animal sources, and fractions or mixture thereof. The lipid may also be selected from waxes, sterols, stanols, terpenes, and fractions or mixture thereof.

The powdered soluble protein-free foaming compositions of this invention can be produced by any method effective to provide a particulate structure having a plurality of internal voids capable of entrapping gas. Conventional gas-injected spray drying of aqueous solutions is the preferred method to manufacture these powdered soluble foaming compositions, but gas-injected extrusion of powder melts is also a suitable method. Spray drying without gas injection typically produces particles having relatively small internal void volumes, but this less preferred method can also be used to manufacture protein-free foaming compositions having suitable internal void volumes. Nitrogen gas is preferred, but any other food-grade gas can be used for gas injection, including air, carbon dioxide, nitrous oxide, or mixture thereof.

The term "entrapped pressurized gas" means that gas having a pressure greater than atmospheric pressure is present in the foaming composition structure and is not able to leave this structure, without opening the powder structure. Preferably, the majority of the pressurized gas present in the foaming composition structure is contained physically within internal voids of the powder structure. Gases that can suitably be used according to the present invention can be selected from nitrogen, carbon dioxide, nitrous oxide, air, or mixture thereof. Nitrogen is preferred, but any other food-grade gas can be used to entrap pressurized gas in the powder structure.

The term "structure", "particulate structure", "particle structure", or "powder structure" means the structure contains a large number of sealed internal voids which are closed to the atmosphere. These voids are capable of holding a large volume of entrapped gas that is released as bubbles upon dissolution of the structure in liquid to produce foam.

The term "powdered soluble foaming composition", "powdered foaming composition", or "foaming composition" means any powder that is soluble in, or disintegrates in a liquid, and especially in an aqueous liquid, and that upon contact with such liquid forms a foam or froth.

The term "protein-free" or "non-protein" means to convey intentional and deliberate avoidance of substances containing any significant amount of protein, to the greatest practical extent, in the formulation of foaming compositions. Accordingly, the protein-free foaming compositions of this invention are virtually free or devoid of protein and contain substantially less than 1%, and typically less than about 0.5%, protein. Preferred protein-free compositions of this invention are devoid of protein. All of the protein-free foaming compositions disclosed in the examples herein are devoid of protein.

Weight percentages are based on the weight of the powdered foaming composition, unless otherwise indicated.

The term "carbohydrate" means any carbohydrate that is compatible with the end use of the powder of the invention. This will in practice mean that it must be acceptable for consumption.

The term "emulsifier" means any surface-active compound that has oil or gas emulsifying properties which is compatible with the end use of the powder of the invention and which is not a protein.

The term "polymeric emulsifier" or "polymeric surface-active substance" generally means any surface-active type of molecule consisting of a number, generally at least five, of monomer units chemically bonded together. These units may for example be amino acids, as in surface-active proteins, or sugar moieties (glucose, mannose, galactose, and the like) or derivatives thereof, such as in surface-active carbohydrates. Generally, the molecular weight of polymeric emulsifiers will exceed 1000 Da.

The term "low molecular weight" in connection with emulsifiers or surface-active materials refers to molecules with a molecular weight below 1000 Da. Generally, adsorption of a monolayer of these molecules at a gas-water or oil-water interface will decrease the interfacial tension by more than 20 mN/m. Only protein-free polymeric or low molecular weight surfactants and emulsifiers are used in this invention.

The term "essentially 100% carbohydrate" used in reference to the non-protein carbohydrate foaming composition means the composition comprises carbohydrate with only trace amounts of non-carbohydrate constituents in an amount less than 1% on a dry basis.

The foaming composition may have a moisture content between 0-15%, typically 1-10%, more typically 2-5% and water activity between 0-0.5, typically 0.05-0.4, and more typically 0.1-0.3.

It is preferable to formulate the foaming ingredient compositions of this invention using one or more surfactants to improve bubble formation and creation of internal voids during spray drying or extrusion. Use of suitable surfactants at appropriate levels can be used to influence the relative size, number, and volume of internal voids available for entrapping gas. It has been discovered that the manufacture of protein-free compositions can be greatly improved by use of surfactants. Two types of surfactants can be distinguished: low molecular weight surfactants and polymeric surfactants. Low molecular weight surfactants include food-approved emulsifying agents such as polysorbates, sucrose esters, stearoyl lactylates, mono/di-glycerides, diacetyl tartaric esters of mono/di-glycerides, and phospholipids. Examples of polymeric surface-active agents include surface-active carbohydrates. These can be used in combination with other carbohydrates to formulate protein-free compositions. Suitable surface-active carbohydrates include gum arabic, propylene glycol alginates, and lipophilic modified food starches such as octenylsuccinate substituted starches also known as emulsifying starches.

More advantageously, the foaming composition may include an emulsifier selected from the group consisting of emulsifying starches, Tween 20 (polyoxyethylene sorbitan-monolaureate), SSL (sodium stearoyl-2-lactylate) or sucrose ester. Preferably, a combination of polymeric surface-active substance, such as an emulsifying starch or propylene glycol alginate (PGA), in combination with a surface-active substance with a low molecular weight, such as Tween or SSL, is used. This emulsifying starch is preferably of the octenylsuccinate-substituted type (e.g. Hi-Cap 100; sodium octenylsuccinate substituted starch; manufactured by National Starch). The use of emulsifying starch alone or in combination with SSL in foaming compositions of this invention was used to provide foam having a preferred combination of attributes, as collectively determined by appearance, bubble size, color, texture and stability. Also, the use of PGA in combination with Tween gave a preferred foam.

Not wishing to be bound by any theory, it is believed that the above combinations are particularly successful because of the following reasons. Protein-stabilized foams and emulsions are known for their excellent long-term stability, which has been attributed to the polymeric character of proteins. Supposedly, an adsorbed interfacial layer of proteins creates a very strong interface leading to stable gas bubbles in foams and stable oil droplets in emulsions. Therewith, use of a non-protein polymeric surface-active substance seems ideal to replace proteins as a foam stabilizer. As polymeric surface-active species generally adsorb only slowly, in a preferred embodiment, low molecular weight emulsifiers are used to also obtain rapid stabilization of the gas bubbles during foam formation.

If desired, the foaming composition may contain other protein-free components such as artificial flavors, aromas, artificial sweeteners, buffers, flow agents, coloring agents, and the like. Suitable artificial sweeteners include saccharin, cyclamates, acesulfame, sucralose, and mixtures of these. Suitable buffers include dipotassium phosphate and trisodium citrate.

Powders which are used for entrapping pressurized gas to manufacture the foaming compositions of this invention have a bulk density and a tap density in the range of 0.1-0.7 g/cc, typically 0.2-0.6 g/cc, a skeletal density in the range of 0.3-1.6 g/cc, typically 0.4-1.5 g/cc, a true density of 1.2-1.6 g/cc, and an internal void volume in the range of 5-80%, typically 10-75%, before subjecting to external gas pressure. Powders with relatively large internal void volumes are generally preferred because of their greater capacity to entrap gas. Internal void volume is suitably at least about 10%, preferably at least about 30%, and more preferably at least about 50%. The powders have a $T_g$ between 30-150° C., typically 40-125° C., and more typically 50-100° C. The powders have a moisture content between 0-15%, typically 1-10%, more typically 2-5% and water activity between 0-0.5, typically 0.05-0.4, and more typically 0.1-0.3.

In one specific embodiment, the non-protein foaming composition contains an emulsifier in an amount of from 0.1-30%, preferably 0.2-20%, and carbohydrate in an amount of from 70-99.9%, preferably 80-99.8%. The emulsifier should be used in an amount sufficient to stabilize gas bubbles present when the powder is dissolved in liquid. It should be noted that if the amount of emulsifier is too high, it might lead to off-flavor or other undesirable properties in the resulting food or beverage. Preferably, a combination of emulsifiers is utilized.

Bulk density (g/cc) is determined by measuring the volume (cc) that a given weight (g) of material occupies when poured through a funnel into a graduated cylinder. Tap density (g/cc) is determined by pouring the powder into a graduated cylinder, vibrating the cylinder until the powder settles to its lowest volume, recording the volume, weighing the powder, and dividing weight by volume. Skeletal density (g/cc) is determined by measuring the volume of a weighed amount of powder using a helium pycnometer (Micromeritics AccuPyc 1330) and dividing weight by volume. Skeletal density is a measure of density that includes the volume of any voids present in the particles that are sealed to the atmosphere and excludes the interstitial volume between particles and the volume of any voids present in the particles that are open to the atmosphere. The volume of sealed voids, referred to herein as internal voids, is derived from also measuring the skeletal density of the powder after grinding with mortar and pestle to remove or open all internal voids to the atmosphere. This type of skeletal density, referred to herein as true density (g/cc), is the actual density of only the solid matter comprising the powder. Internal void volume (%), the volume percent of sealed internal voids contained in the particles comprising the powder, is determined by subtracting the reciprocal true density (cc/g) from the reciprocal skeletal density (cc/g) and then multiplying the difference by skeletal density (g/cc) and 100%.

The glass transition temperature ($T_g$) marks a secondary phase change characterized by transformation of the powder composition from a rigid glassy state to a softened rubbery state. In general, gas solubilities and diffusion rates are higher in materials at or above the $T_g$. The $T_g$ is dependent on chemical composition and moisture level and, in general, lower average molecular weight and/or higher moisture will lower $T_g$. The $T_g$ can intentionally be raised or lowered by simply decreasing or increasing, respectively, the moisture content of the powder using any suitable method known to one skilled in the art. The $T_g$ can be measured using established Differential Scanning Calorimetry or Thermal Mechanical Analysis techniques.

Novel foaming compositions of this invention that contain entrapped pressurized gas can be manufactured by heating the protein-free powder having appropriate particle structure under pressure in any suitable pressure vessel and cooling the powder either by rapid release of pressure or by cooling the vessel prior to depressurization. The preferred method is to seal the powder in the pressure vessel and pressurize with compressed gas, then heat the pressure vessel either by placing in a preheated oven or bath or by circulation of electric current or hot fluid through an internal coil or external jacket to increase the temperature of the powder to above the $T_g$ for a period of time effective to fill internal voids in the particles with pressurized gas, then cool the still pressurized vessel containing the powder to about room temperature either by placing in a bath or by circulation of cold fluid, then release the pressure and open the vessel to recover the foaming composition. The foaming composition can be produced in batches or continuously using any suitable means. Novel foaming compositions of this invention that contain atmospheric pressure gas can be produced in the same manner with the exception that heating is conducted below the $T_g$ of the powder.

In general, powders are heated at a temperature in the range of 20-200° C., preferably 40-175° C., and more preferably 60-150° C. for 1-300 minutes, preferably 5-200 minutes, and more preferably 10-150 minutes. The pressure inside the pressure vessel is in the range of 20-3000 psi, preferably 100-2000 psi, and more preferably 300-1500 psi. Use of nitrogen gas is preferred, but any other food-grade gas can be used to pressurize the vessel, including air, carbon dioxide, nitrous oxide, or mixture thereof. Powder gas content and foaming capacity generally increase with processing pressure. Heating can cause the initial pressure delivered to the pressure vessel to increase considerably. The maximum pressure reached inside the pressure vessel during heating can be approximated by multiplying the initial pressure by the ratio of heating temperature to initial temperature using Kelvin units of temperature. For example, pressurizing the vessel to 1000 psi at 25° C. (298 K) and then heating to 120° C. (393 K) should increase the pressure in the pressure vessel to approximately 1300 psi.

At temperatures at or above the $T_g$, particle gas content and foaming capacity increase with processing time until a maximum is reached. The rate of gasification generally increases with pressure and temperature and relatively high pressures and/or high temperatures can be used to shorten processing time. However, increasing temperature to greatly beyond what is required for effective processing can make the powder susceptible to collapse. Particle size distribution of the powders is typically not meaningfully altered when gasification is conducted under more preferred conditions. However, significant particle agglomeration or caking can occur when gasification is conducted under less preferred conditions such as excessively high temperature and/or long processing time. It is believed that gas dissolved in the softened gas-permeable solid matter during heating diffuses into internal voids until pressure equilibrium is reached or until the powder is cooled to below the $T_g$. Therefore, it is to be expected that the cooled particles should retain both pressurized gas entrapped in internal voids and gas dissolved in the solid matter.

When powders are pressurized at a temperature at or above the $T_g$, it is common for some of the particles to explode with a loud cracking sound during a brief time after depressurization due to bursting of localized regions of the particle structure that are too weak to retain the pressurized gas. In contrast, when powders are pressurized below the $T_g$ and depressurized, it is less common for particles to explode and any explosions occur with less sound and force. However, it is common for these particles to produce a faint popping sound during a brief time after depressurization. Powder appearance and bulk density are typically not significantly altered by pressurizing below the $T_g$, but skeletal density and internal void volume are typically significantly altered.

The foaming compositions retain pressurized gas with good stability when stored below the $T_g$ with adequate protection against moisture intrusion. Foaming compositions stored in a closed container at room temperature generally perform well many months later. Powders pressurized below the $T_g$ do not retain pressurized gas for a long period of time. However, it has been surprisingly discovered that spray-dried powders that are pressurized below the $T_g$ typically produce significantly more froth than the unpressurized powders even after the pressurized gas is lost. It is believed that this beneficial increase in foaming capacity is caused by infiltration of atmospheric pressure gas into previously vacuous internal voids formed by evaporation of water from the particles during drying. It has been found that this novel method to increase the foaming capacity of spray-dried foaming compositions can be conducted at room temperature with excellent results.

Foaming compositions manufactured according to the embodiments of this invention have a bulk density and a tap density in the range of 0.1-0.7 g/cc, typically 0.2-0.6 g/cc, a skeletal density in the range of 0.3-1.6 g/cc, typically 0.5-1.5 g/cc, and more typically 0.7-1.4 g/cc, a true density in the range of 1.2-1.6 g/cc, an internal void volume in the range of 2-80%, typically 10-70%, and more typically 20-60%, and contain pressurized gas in the range of 20-3000 psi, typically 100-2000 psi, and more typically 300-1500 psi. As a point of reference, atmospheric pressure is about 15 psi at sea level. Pressure treatment at any temperature typically increases skeletal density and decreases internal void volume. Bulk density is typically not significantly altered by pressure treatment below the $T_g$, but is typically increased by pressure treatment above the $T_g$. Changes in bulk density, skeletal density, and internal void volume are collectively determined by powder composition and processing conditions including treatment time, temperature, and pressure. The resulting powdered foaming compositions containing entrapped pressurized gas generally have particle size between about 1 to 5000 microns, typically between about 5 to 2000 microns, and more typically between about 10 to 1000 microns.

The preferred use for these novel foaming compositions is in soluble beverage mixes, particularly instant coffee and cappuccino mixes. However, they can be used in any instant food product that is rehydrated with liquid. Although these foaming compositions typically dissolve well in cold liquids to produce froth, dissolution and foaming capacity are generally improved by reconstitution in hot liquids. Applications include instant beverages, desserts, cheese powders, cereals, soups, topping powders, and other products.

Example 1

A commercial protein-free 1 ODE maltodextrin powder, produced by gas-injected spray drying of an aqueous solution, was obtained. The essentially 100% carbohydrate powder had white color, a bulk density of 0.12 g/cc, a tap density of 0.15 g/cc, a skeletal density of 1.40 g/cc, an internal void volume of 10%, a true density of 1.56 g/cc, and a $T_g$ of 65° C. 5 g of the maltodextrin powder was pressurized with carbon dioxide gas at 500 psi in a stainless steel pressure vessel (75 cc capacity gas-sampling cylinder; manufactured by Whitey Corporation; used in all examples herein), heated in a 110° C. oven for 4 hours, and then cooled by rapid depressurization. The powder pressurized with carbon dioxide gas had white color, a bulk density of 0.37 g/cc, a tap density of 0.47 g/cc, a skeletal density of 1.43 g/cc, and an internal void volume of 8%. Another 5 g sample of the maltodextrin powder was pressurized with nitrogen gas at 1000 psi, heated in a 95° C. oven for 2.5 hours, and then cooled to about room temperature before depressurizing resulting in a treated powder with a white color, a bulk density of 0.15 g/cc, a tap density of 0.18 g/cc, a skeletal density of 1.50 g/cc, and an internal void volume of 4%. Each treated and untreated maltodextrin powder was used to formulate an instant cappuccino mix, using a weight ratio of about one part maltodextrin powder to one part soluble coffee to two parts sugar and three parts foaming creamer, and about 13 g of each cappuccino mix was reconstituted in a 250 ml beaker having 65 mm internal diameter using 130 ml of 88° C. water.

Knowledge of the reconstituted beverage mix froth density and incremental froth volume contributed by the treated and untreated powders was used to estimate the amount (corrected to room temperature and pressure) of gas released by each powder. Replacing the untreated powder with an equal weight of treated powder in the cappuccino mix revealed that the pressure treatment using carbon dioxide increased the foaming capacity of the powder by over 2-fold, increasing the amount of gas released from about 2 cc gas per gram of powder to about 4.5 cc gas per gram of powder. The pressure treatment using nitrogen increased the foaming capacity of the powder by over 3-fold, increasing the amount of gas released from about 2 cc gas per gram of powder to about 7 cc gas per gram of powder. The pressure-treated powders produced a cracking sound when reconstituted in the cappuccino mix. All cappuccino beverages had excellent flavor.

Example 2

A 50% aqueous solution of 33 DE glucose syrup solids (92% dry basis) and sodium octenylsuccinate substituted starch (8% dry basis) was nitrogen injected and spray dried to produce a protein-free powder comprised of particles having a plurality of internal voids. The essentially 100% carbohydrate powder had white color, a bulk density of 0.25 g/cc, a tap density of 0.31 g/cc, a skeletal density of 0.59 g/cc, an internal void volume of 61%, a true density of 1.51 g/cc, a $T_g$ of 74° C., and moisture content of about 2%. Use of the powder in an instant sweetened coffee mix, using a weight ratio of about three parts powder to one part soluble coffee to two parts sugar, produced an amount of froth that completely covered the surface of the beverage to a height of about 7 mm when about 11 g of the mix was reconstituted in a 250 ml beaker having 65 mm internal diameter using 130 ml of 88° C. water.

6 g of the protein-free powder was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 140%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 2 cc gas per gram of powder while the treated powder released about 5 cc gas per gram of powder. The powder produced a faint popping sound for a short time after depressurization, presumably due to bursting of walls surrounding diffusion-restricted open voids that were too weak to contain the pressurized gas. Bulk density of the treated powder was not altered, but skeletal density increased to 0.89 g/cc and internal void volume decreased to 41%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Another 6 g sample of the protein-free powder was pressurized with nitrogen gas at 1000 psi, heated in a 120° C. oven for 30 minutes, and then cooled to about room temperature before depressurizing. The treatment trapped pressurized gas in the powder and many particles exploded with a loud cracking sound for a short time after depressurization. The treated powder had white color, a tap density of 0.33 g/cc, a skeletal density of 1.18 g/cc, and an internal void volume of 22%. Replacing the untreated powder with an equal weight of treated powder in the sweetened coffee mix revealed that treatment increased the foaming capacity of the powder by over 4-fold, increasing the amount of gas released from about 2 cc gas per gram of powder to about 9 cc gas per gram of powder.

Another 6 g sample of the protein-free powder was pressurized with nitrogen gas at 1000 psi, heated in a 120° C. oven for 60 minutes, and then cooled to about room temperature before depressurizing. The treatment trapped pressurized gas in the powder and a comparably larger proportion of particles exploded with louder cracking sound for a short time after depressurization. The treated powder had white color, a tap density of 0.41 g/cc, a skeletal density of 1.00 g/cc, and an internal void volume of 34%. Replacing the untreated powder with an equal weight of treated powder in the sweetened coffee mix revealed that treatment increased the foaming capacity of the powder by about 6-fold, increasing the amount of gas released from about 2 cc gas per gram of powder to about 12 cc gas per gram of powder.

Another 6 g sample of the protein-free powder was pressurized with nitrogen gas at 1000 psi, heated in a 120° C. oven for 80 minutes, and then cooled to about room temperature before depressurizing. The treatment trapped pressurized gas in the powder and a comparably even larger proportion of particles exploded with even louder cracking sound for a short time after depressurization. The treated powder had white color, a tap density of 0.41 g/cc, a skeletal density of 1.02 g/cc, and an internal void volume of 32%. Replacing the untreated powder with an equal weight of treated powder in the sweetened coffee mix revealed that treatment increased the foaming capacity of the powder by over 10-fold, increasing the amount of gas released from about 2 cc gas per gram of powder to about 21 cc gas per gram of powder.

All sweetened coffee beverages had excellent flavor. However, release of greater volumes of gas from the pressure-treated powders on contact with water increased particle buoyancy and decreased particle wetability, which impaired dispersability and dissolution of the pressure-treated powders relative to the untreated powder. The sweetened coffee mix containing the untreated powder dispersed and dissolved instantaneously upon addition of water, without the need for stirring, and the resulting beverage, froth, and beaker wall were completely devoid of undissolved powder. In contrast, the sweetened coffee mixes containing treated powders did not disperse and dissolve instantaneously upon addition of water, as evidenced by the presence of adhering sheets of undissolved unwetted powder covering large areas of the beaker wall and by the presence of large undissolved unwetted powder clumps suspended in the froth. In the absence of stirring, it typically took several minutes for the adhering sheets to completely dissolve and, because of the relative scarcity of water, the powder clumps in the froth persisted seemingly indefinitely and appeared largely unchanged even after fifteen minutes. However, this impairment in powder dispersability and dissolution was suitably remedied by stirring reconstituted mixes containing treated powders to expedite dispersion and dissolution. The type and extent of impaired powder dispersability and dissolution, caused by release of entrapped pressurized gas, demonstrated in this example are typical of foaming compositions prepared according to this invention.

Example 3

A 50% aqueous solution of 33 DE glucose syrup solids (98.5% dry basis), polysorbate 20 (1% dry basis), and propylene glycol alginate (0.5% dry basis) was nitrogen injected and spray dried to produce a protein-free powder comprised of particles having a plurality of internal voids. The approximately 99% carbohydrate powder had white color, a bulk density of 0.24 g/cc, a tap density of 0.30 g/cc, a skeletal density of 0.64 g/cc, an internal void volume of 56%, a true density of 1.47 g/cc, a $T_g$ of 68° C., and moisture content of about 4%. Use of the powder in the sweetened coffee mix according to the method of Example 2 produced an amount of froth that completely covered the surface of the beverage to a height of about 11 mm when about 11 g of the mix was reconstituted in a 250 ml beaker having 65 mm internal diameter using 130 ml of 88° C. water.

6 g of the protein-free powder was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 65%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 3.5 cc gas per gram of powder while the treated powder released about 6 cc gas per gram of powder. The powder produced a faint popping sound for a short time after depressurization. Bulk density of the treated powder was not altered, but skeletal density increased to 1.04 g/cc and internal void volume decreased to 29%, indicating the force of pressurization and/or depressurization opened a portion of previously vacuous internal voids, formed during particle dehydration, to the atmosphere to increase foaming capacity. This hypothesis is supported by the fact that even after one week, the treated powder fully retained its increased foaming capacity.

Another 6 g sample of the protein-free powder was pressurized with nitrogen gas at 1000 psi, heated in a 120° C. oven for 15 minutes, and then cooled to about room temperature before depressurizing. The treatment trapped pressurized gas in the powder and many particles exploded with a loud cracking sound for a short time after depressurization. The treated powder had white color, a tap density of 0.32 g/cc, a skeletal density of 1.31 g/cc, and an internal void volume of 11%. Replacing the untreated powder with an equal weight of treated powder in the sweetened coffee mix revealed that treatment increased the foaming capacity of the powder by about 3-fold, increasing the amount of gas released from about 3.5 cc gas per gram of powder to about 10.5 cc gas per gram of powder.

Another 6 g sample of the protein-free powder was pressurized with nitrogen gas at 1000 psi, heated in a 120° C. oven for 30 minutes, and then cooled to about room temperature before depressurizing. The treatment trapped pressurized gas in the powder and a comparably even larger proportion of particles exploded with even louder cracking sound for a short time after depressurization. The treated powder had white color, a tap density of 0.50 g/cc, a skeletal density of 1.19 g/cc, and an internal void volume of 19%. Replacing the untreated powder with an equal weight of treated powder in the sweetened coffee mix revealed that treatment increased the foaming capacity of the powder by nearly 5-fold, increasing the amount of gas released from about 3.5 cc gas per gram of powder to about 17 cc gas per gram of powder. All sweetened coffee beverages had excellent flavor.

Example 4

The following table summarizes the results obtained when additional 6 g samples of the spray-dried protein-free powder of Example 3 were pressurized with nitrogen gas for 30 minutes at 120° C. in a pressure vessel at the pressures listed below according to the method of Example 3 when an equal weight of treated powder was substituted for the untreated powder in the sweetened coffee mix prepared according to the method of Example 2. The Untreated Product is the untreated powder of Example 3 and is included in the table for comparison. Product A is another sample of the untreated powder that was pressurized at 250 psi; Product B is another sample of the untreated powder that pressurized at 375 psi; and Product C is another sample of the untreated powder that pressurized at 500 psi. Product D is the powder of Example 3 that was pressurized at 1000 psi and is included in the table for comparison. All sweetened coffee beverages had excellent flavor.

| Product | Initial Pressure (psi) | Maximum Pressure (psi) | % Increase in Coffee Mix Froth Height (in 250 ml Beaker) | Estimated Gas Release from Foaming Composition (cc Gas/g Powder) |
|---|---|---|---|---|
| Untreated | — | — | — | 3.5 |
| A | 250 | 350 | 50 | 6 |
| B | 375 | 500 | 200 | 13 |
| C | 500 | 650 | 250 | 15 |
| D | 1000 | 1300 | 300 | 17 |

Example 5

Several additional samples of treated and untreated protein-free powders of Examples 2 and 3 were used in an instant cappuccino mix, using a weight ratio of about two parts powder to one part soluble coffee to two parts sugar to two parts non-foaming non-dairy creamer, to produce beverages that were completely covered by froth when about 14 g of the mix was reconstituted in a 250 ml beaker having 65 mm internal diameter using 130 ml of 88° C. water. In this product application, each untreated powder produced a froth height of about 8 mm and a beverage height of about 40 mm. The treated powders of Example 2 that were pressurized for 30 minutes and 60 minutes at 120° C. produced froth heights of about 20 mm and about 40 mm, respectively. The treated powders of Example 3 that were pressurized for 15 minutes and 30 minutes at 120° C. produced froth heights of about 18 mm and about 35 mm, respectively. The froth produced by the treated and untreated powders had creamy texture and small bubble size typical of instant cappuccino froth, but only the mixes containing the treated powders produced a cracking sound when reconstituted. A continuous covering of froth was not produced in the instant cappuccino beverage without addition of treated or untreated powder. All cappuccino beverages had excellent flavor.

Example 6

An additional 10 g sample of the untreated protein-free powder of Example 3 was mixed with 10 g of sugar and 2 g of soluble coffee powder. The mix was reconstituted with 240 ml of cold skim milk in a 400 ml beaker having 72 mm internal diameter to produce a cold cappuccino beverage at a height of about 65 mm that was completely covered by froth at a height of about 10 mm. The untreated powder was replaced with an equal weight of another sample of the treated powder of Example 3 that was pressurized for 30 minutes at 120° C. Reconstituting the mix in the same manner produced a beverage at a height of about 60 mm that was completely covered by froth at a height of about 35 mm. The froth produced by the treated and untreated powders had creamy texture and small bubble size typical of a cappuccino drink, but only the mix containing the treated powder produced a cracking sound when reconstituted. A continuous covering of froth was not produced in the cold cappuccino beverage without addition of treated or untreated powder. All cappuccino beverages had excellent flavor.

Example 7

Another 5 g sample of the untreated protein-free powder of Example 3 was mixed with 28 g of Swiss Miss® Hot Cocoa Mix. The mix was reconstituted with 180 ml of 90° C. in a 250 ml beaker having 65 mm internal diameter to produce a hot cocoa beverage at a height of about 60 mm that was completely covered by froth at a height of about 8 mm. The untreated powder was replaced with an equal weight of another sample of the treated powder of Example 3 that was pressurized for 30 minutes at 120° C. Reconstituting the mix in the same manner produced a beverage at a height of about 60 mm that was completely covered by froth at a height of about 15 mm. The froth produced by the treated and untreated powders had creamy texture and small bubble size, but only the mix containing the treated powder produced a cracking sound when reconstituted. A continuous layer of froth at a height of only about 5 mm was produced in the hot cocoa beverage without addition of treated or untreated powder. All hot cocoa beverages had excellent flavor.

Example 8

Another 5 g sample of the untreated protein-free powder of Example 3 was mixed with 13 g of Lipton® Cup-a-Soup®. The mix was reconstituted with 180 ml of 90° C. water in a 250 ml beaker having 65 mm internal diameter to produce a hot soup at a height of 60 mm that was completely covered by froth at a height of about 12 mm. The untreated powder was replaced with an equal weight of another sample of the treated powder of Example 3 that was pressurized for 30 minutes at 120° C. Reconstituting the mix in the same manner produced a hot soup at a height of about 55 mm that was completely covered by froth at a height of about 25 mm. The froth produced by the treated and untreated powders had creamy texture and small bubble size, but only the mix containing the treated powder produced a cracking sound when reconstituted. No significant amount of froth was produced in the hot soup without addition of treated or untreated powder. All hot soups had excellent flavor.

Example 9

Another 10 g sample of the untreated protein-free powder of Example 3 was mixed with 17 g of sugar-sweetened cherry-flavored Kool-Aid® brand soft drink mix and reconstituted with 240 ml cold water in a 400 ml beaker having 72 mm internal diameter to produce a cold red beverage at a height of 65 mm that was completely covered by white froth at a height of about 9 mm. The untreated powder was replaced with an equal weight of another sample of the treated powder of Example 3 that was pressurized for 30 minutes at 120° C. Reconstituting this mix in the same manner produced a beverage at a height of about 60 mm that was completely covered by white froth at a height of about 30 mm. The froth produced by the treated and untreated powders had creamy texture and small bubble size, but only the mix containing the treated powder produced a cracking sound when reconstituted. No froth was produced in the beverage without addition of treated or untreated powder. All flavored beverages had excellent flavor.

Example 10

Another 10 g sample of the untreated protein-free powder of Example 3 was mixed with the cheese powder provided in a package of Kraft® brand Easy Mac® macaroni and cheese dinner. Water was added to the pasta in a bowl and cooked in a microwave according to package instructions. Addition of the cheese powder mix containing the untreated powder to the pasta produced a cheese sauce having frothy texture. The untreated powder was replaced with an equal weight of another sample of the treated powder of Example 3 that was pressurized for 30 minutes at 120° C. Addition of this mix to the cooked pasta in the same manner produced a cheese sauce having very frothy texture. Only the cheese powder mix containing the treated powder produced a cracking sound when reconstituted. No significant extent of frothy texture was produced in the cheese sauce without addition of treated or untreated powder. All cheese sauces had excellent flavor.

Example 11

A 50% aqueous solution of 33 DE glucose syrup solids (82% dry basis) and surface-active sodium octenylsuccinate substituted starch (8% dry basis) containing a dispersed emulsion of partially hydrogenated soybean oil (10% dry basis) was nitrogen injected and spray dried to produce a protein-free powder comprised of particles having a plurality of internal voids. The approximately 90% carbohydrate powder had white color, a bulk density of 0.21 g/cc, a tap density of 0.26 g/cc, a skeletal density of 0.52 g/cc, an internal void volume of 64%, a true density of 1.44 g/cc, a $T_g$ of 65° C., and moisture content of about 3%. Use of the powder in an instant sweetened coffee mix according to the method of Example 2 produced an amount of froth that completely covered the surface of the beverage to a height of about 10 mm when about 11 g of the mix was reconstituted in a 250 ml beaker having 65 mm internal diameter using 130 ml of 88° C. water.

6 g of the protein-free powder was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 100%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 3.5 cc gas per gram of powder while the treated powder released about 6.5 cc gas per gram of powder. The powder produced a faint popping sound for a short time after depressurization, presumably due to bursting of walls surrounding diffusion-restricted open voids that were too weak to contain the pressurized gas. Bulk density of the treated powder was not altered, but skeletal density increased to 0.64 g/cc and internal void volume decreased to 56%, indicating the force of pressurization and/or depressurization opened a portion of previously vacuous internal voids, formed during particle dehydration, to the atmosphere to increase foaming capacity.

Another 6 g sample of the protein-free powder was pressurized with nitrogen gas at 1000 psi, heated in a 120° C. oven for 30 minutes, and then cooled to about room temperature before depressurizing. The treatment trapped pressurized gas in the powder and many particles exploded with a loud cracking sound for a short time after depressurization. The treated powder had white color, a tap density of 0.32 g/cc, a skeletal density of 0.79 g/cc, and an internal void volume of 45%. Replacing the untreated powder with an equal weight of treated powder in the sweetened coffee mix revealed that treatment increased the foaming capacity of the powder by nearly 3-fold, increasing the amount of gas released from about 3.5 cc gas per gram of powder to about 9.5 cc gas per gram of powder. All sweetened coffee beverages have excellent flavor.

Example 12

Another 5 g sample of the treated protein-free powder of Example 3 that was pressurized for 30 minutes at 120° C. was mixed with 15 g skim milk powder and 10 g sugar. The mix was reconstituted with 20 ml of 5° C. water in a 150 ml beaker having 54 mm internal diameter and stirred with a spoon to dissolve. A cold fat-free dessert topping having a thick, creamy, whipped-like, aerated texture was produced at a height of about 40 mm. The treated powder was replaced with an equal weight of another sample of the untreated powder of Example 3. Reconstituting this mix in the same manner produced a topping with only slightly aerated texture at a height of about 25 mm. Reconstituting only the mixture of skim milk powder and sugar in the same manner produced an unappealing runny topping without aerated texture at a height of about 20 mm. In summary, the untreated powder imparted about 25% volume overrun to the topping preparation and improved the texture somewhat while the treated powder imparted about 100% volume overrun to the topping preparation and greatly improved the texture. All toppings had excellent flavor.

Example 13

Another 10 g sample of the treated protein-free powder of Example 3 that was pressurized for 30 minutes at 120° C. was mixed with 28 g Quaker instant oatmeal. The mix was reconstituted with 120 ml 90° C. water in a 400 ml beaker having 72 mm internal diameter and stirred with a spoon to dissolve the powder. A hot cereal was produced at a height of about 35 mm that was completely covered by thick creamy froth at a height of about 25 mm. The froth was easily stirred into the cereal to create a rich, creamy, aerated texture. The treated powder was replaced with an equal weight of another sample of the untreated powder of Example 3. Reconstituting this mix in the same manner produced a hot cereal at a height of about 40 mm that was completely covered by thick creamy froth at a height of about 7 mm. The froth was easily stirred into the cereal to create a slightly aerated texture. Reconstituting only the instant oatmeal in the same manner produced a hot cereal at a height of about 40 mm with no froth and without aerated texture. Only the oatmeal mix containing the treated powder produced a cracking sound when reconstituted. All hot instant cereals had excellent flavor.

Comparison Example

A 50% aqueous solution of lactose and 33 DE glucose syrup solids (52% dry basis), skim milk powder (47% dry basis), and disodium phosphate (1% dry basis) was nitrogen injected and spray dried to produce a powder containing carbohydrate and protein. The powder had light yellow color, clean milky odor and flavor, a bulk density of 0.34 g/cc, a tap density of 0.40 g/cc, a skeletal density of 0.71 g/cc, an internal void volume of 52%, a true density of 1.49 g/cc, a $T_g$ of 61° C., and moisture content of about 3%. Use of the powder in an instant sweetened coffee mix according to the method of Example 2 produced a moderate amount of froth that completely covered the surface of the beverage to a height of about 10 mm when about 11 g of the mix was reconstituted in a 250 ml beaker having 65 mm internal diameter using 130 ml of 88° C. water. The sweetened coffee mix containing the powder had a clean milky flavor.

6 g of the powder containing carbohydrate and protein was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 160%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 3.5 cc gas per gram of powder while the treated powder released about 8.5 cc gas per gram of powder. The powder produced a faint popping sound for a short time after depressurization, presumably due to bursting of walls surrounding diffusion-restricted open voids that were too weak to contain the pressurized gas. Bulk density of the treated powder was not altered, but skeletal density increased to 0.75 g/cc and internal void volume decreased to 50%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Another 6 g sample of the powder containing carbohydrate and protein was pressurized with nitrogen gas at 1000 psi in a pressure vessel, heated in a 120° C. oven for 15 minutes, and then cooled to about room temperature before depressurizing. The treatment trapped pressurized gas in the powder and many particles exploded with a cracking sound for a short time after depressurization. The treated powder had light yellow color, a cooked, astringent, processed flavor, a tap density of 0.45 g/cc, a skeletal density of 0.98 g/cc, and an internal void volume of 34%. Replacing the untreated powder with an equal weight of treated powder in the sweetened coffee mix revealed that treatment increased the foaming capacity of the powder by nearly 6-fold, increasing the amount of gas released from about 3.5 cc gas per gram of powder to about 20 cc gas per gram of powder. The sweetened coffee mix containing the treated powder had an undesirable cooked, astringent, processed flavor.

Another 6 g sample of the powder containing carbohydrate and protein was pressurized with nitrogen gas at 1000 psi in a pressure vessel, heated in a 120° C. oven for 30 minutes, and then cooled to about room temperature before depressurizing. The treatment trapped pressurized gas in the powder and a comparably larger proportion of particles exploded with a cracking sound for a short time after depressurization. The treated powder had darker yellow color, caramelized odor, a harsh, astringent, processed flavor, a tap density of 0.44 g/cc, a skeletal density of 0.94 g/cc, and an internal void volume of 37%. Replacing the untreated powder with an equal weight of treated powder in the sweetened coffee mix revealed that treatment increased the foaming capacity of the powder by 5-fold, increasing the amount of gas released from about 3.5 cc gas per gram of powder to about 17.5 cc gas per gram of powder. The sweetened coffee mix containing the treated powder had an undesirable harsh, astringent, processed flavor.

Another 6 g sample of the powder containing carbohydrate and protein was pressurized with nitrogen gas at 1000 psi in a pressure vessel, heated in a 120° C. oven for 60 minutes, and then cooled to about room temperature before depressurizing. The treatment trapped pressurized gas in the powder and a comparably even larger proportion particles exploded with a cracking sound for a short time after depressurization. The treated powder had brown color, caramelized odor, a harsh, astringent, burnt flavor, a tap density of 0.49 g/cc, a skeletal density of 0.98 g/cc, and an internal void volume of 34%. Replacing the untreated powder with an equal weight of treated powder in the sweetened coffee mix revealed that treatment increased the foaming capacity of the powder by nearly 4-fold, increasing the amount of gas released from about 3.5 cc gas per gram of powder to about 13.5 cc gas per gram of powder. The sweetened coffee mix containing the treated powder had an undesirable harsh, astringent, burnt flavor.

Although the invention has been described in considerable detail with respect to preferred embodiments, it will be apparent that the invention is capable of numerous modifications and variations, apparent to those skilled in the art, without departing from the spirit and scope of the invention.

What is claimed is:

1. A foaming composition comprising:
   a protein-free foaming powdered soluble composition comprising carbohydrate particles having a plurality of internal voids containing entrapped pressurized gas, and substantially less than one percent protein on a dry-weight basis,
   wherein upon contact of the protein-free foaming powdered soluble composition with a liquid, the entrapped pressurized gas is released from the plurality of internal voids which results in an impaired dispersability and dissolution of the protein-free foaming powdered soluble composition relative to the same protein-free foaming powdered soluble composition without having entrapped pressurized gas.

2. The foaming composition of claim 1, wherein the powdered soluble composition comprises greater than 90% carbohydrate on a dry-weight basis.

3. The foaming composition of claim 1, wherein the powdered soluble composition comprises greater than 98% carbohydrate on a dry-weight basis.

4. The foaming composition of claim 1, wherein the powdered soluble composition comprises essentially 100% carbohydrate on a dry-weight basis.

5. The foaming composition of claim 1, wherein the protein-free foaming soluble composition releases at least 2 cc of gas per gram of said composition when dissolved in liquid at ambient conditions.

6. The foaming composition of claim 1, wherein the protein-free foaming soluble composition releases at least 5 cc of gas per gram of said composition when dissolved in liquid at ambient conditions.

7. The foaming composition of claim 1, wherein the protein-free foaming soluble composition is selected from the group consisting of a sugar, polyhydric alcohol, sugar alcohol, oligosaccharide, polysaccharide, starch hydrolysis product, gum, soluble fiber, modified starch, modified cellulose, and mixtures thereof.

8. The foaming composition of claim 1, wherein said protein-free foaming soluble composition further comprises a non-protein surfactant.

9. The foaming composition of claim 8, wherein said non-protein surfactant is an emulsifier.

10. The foaming composition of claim 9, wherein the carbohydrate is present in an amount in a range from greater than 98 to 99.9% by weight and the emulsifier is present in an amount from 0.1% to 2% by weight.

11. The foaming composition of claim 1, wherein said protein-free foaming soluble composition comprises less than 0.5% protein on a dry-weight basis.

12. The foaming composition of claim 1, wherein said protein-free foaming soluble composition comprises no protein.

13. A foaming composition comprising:
   protein-free foaming particles comprising substantially less than 1% protein on a dry-weight basis, the foaming particles having a plurality of internal voids containing entrapped pressurized gas, said particles formed from subjecting said particles to an external gas pressure exceeding atmospheric pressure prior to or while heating said particles to a temperature of at least the glass transition temperature and then cooling said particles to a temperature below said glass transition temperature prior to or while releasing said external gas pressure in a manner effective to trap said pressurized gas within said internal voids,
   wherein upon contact of the protein-free foaming powdered soluble composition with a liquid, the entrapped pressurized gas is released from the plurality of internal voids which results in an impaired dispersability and dissolution of the protein-free foaming powdered soluble composition relative to the same protein-free foaming powdered soluble composition without having entrapped pressurized gas.

14. The foaming composition of claim 13, wherein the foaming particles comprise less than 0.5% protein on a dry-weight basis.

15. The foaming composition of claim 13, wherein the foaming particles comprise no protein.

16. The foaming composition of claim 13, wherein said foaming particles release at least 2 cc of gas per gram of said composition when dissolved in liquid at ambient conditions.

17. A soluble consumable food product, said food product comprising:
   a protein-free foaming powdered composition comprising carbohydrate particles having a plurality of internal voids containing entrapped pressurized gas, and substantially less than 1% protein on a dry-weight basis,
   wherein upon contact of the protein-free foaming powdered soluble composition with a liquid, the entrapped pressurized gas is released from the plurality of internal voids which results in an impaired dispersability and dissolution of the protein-free foaming powdered soluble composition relative to the same protein-free foaming powdered soluble composition without having entrapped pressurized gas.

18. The soluble consumable food product of claim 17, wherein the foaming powdered composition comprises no protein.

19. The consumable food product of claim 17, further comprising an additional food product.

20. A method for manufacturing a foaming composition, said method comprising:
   heating soluble protein-free foaming particles comprising a carbohydrate and substantially less than 1% protein on a dry-weight basis and having internal voids;
   applying external gas pressure exceeding atmospheric pressure to the protein-free soluble foaming particles;
   cooling the soluble foaming particles; and
   releasing the external gas pressure, thereby resulting in pressurized gas remaining in the internal voids,
   wherein upon contact of the protein-free foaming powdered soluble composition with a liquid, the entrapped pressurized gas is released from the plurality of internal voids which results in an impaired dispersability and dissolution of the protein-free foaming powdered soluble composition relative to the same protein-free foaming powdered soluble composition without having entrapped pressurized gas.

21. The method of claim 20, wherein the soluble foaming particles comprise no protein.

22. The method of claim 20, wherein said applying external gas pressure is conducted prior to heating the particles.

23. The method of claim 20, wherein said applying external gas pressure is conducted while heating the particles.

24. The method of claim 20, wherein said heating protein-free soluble foaming particles is conducted at a temperature of at least the glass transition temperature of the particles.

25. The method of claim 24, wherein said cooling is conducted prior to said releasing the external gas pressure.

26. The method of claim 24, wherein said cooling is conducted while releasing the external gas pressure.

27. The foaming composition of claim 1, wherein the carbohydrate particles release entrapped pressurized gas from the internal voids upon dissolution of the carbohydrate particles in a liquid.

28. The foaming composition of claim 1, wherein the protein-free foaming powdered soluble composition is soluble in an aqueous solution.

29. The foaming composition of claim 13, wherein the foaming particles release entrapped pressurized gas from the plurality of internal voids when the foaming particles are dissolved in a liquid.

30. The foaming composition of claim 13, wherein the protein-free particles are soluble in an aqueous solution.

31. A foaming soluble fruit-flavored beverage comprising:
a protein-free foaming powdered soluble composition comprising carbohydrate particles having a plurality of internal voids containing entrapped pressurized gas, and substantially less than one percent protein on a dry-weight basis, wherein upon contact of the protein-free foaming powdered soluble composition with a liquid, the entrapped pressurized gas is released from the plurality of internal voids which results in an impaired dispersability and dissolution of the protein-free foaming powdered soluble composition relative to the same protein-free foaming powdered soluble composition without having entrapped pressurized gas; and
a powdered fruit-flavored soft drink mix.

* * * * *